March 18, 1958 — R. Z. REEDER — 2,827,188
BOAT TRAILER
Filed June 20, 1957 — 2 Sheets-Sheet 1
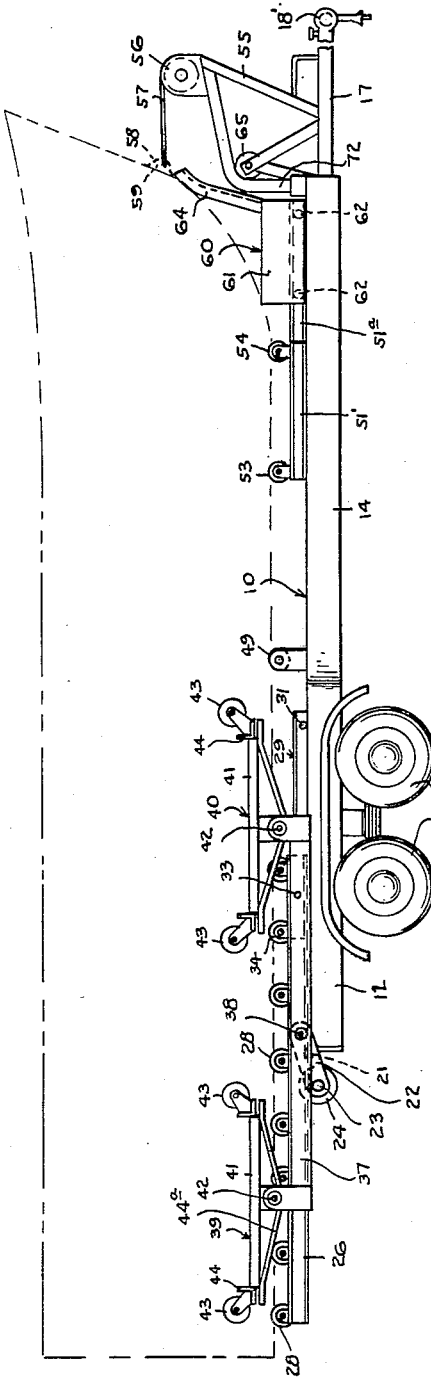
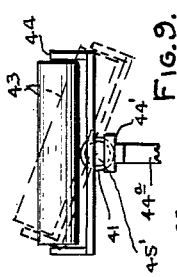
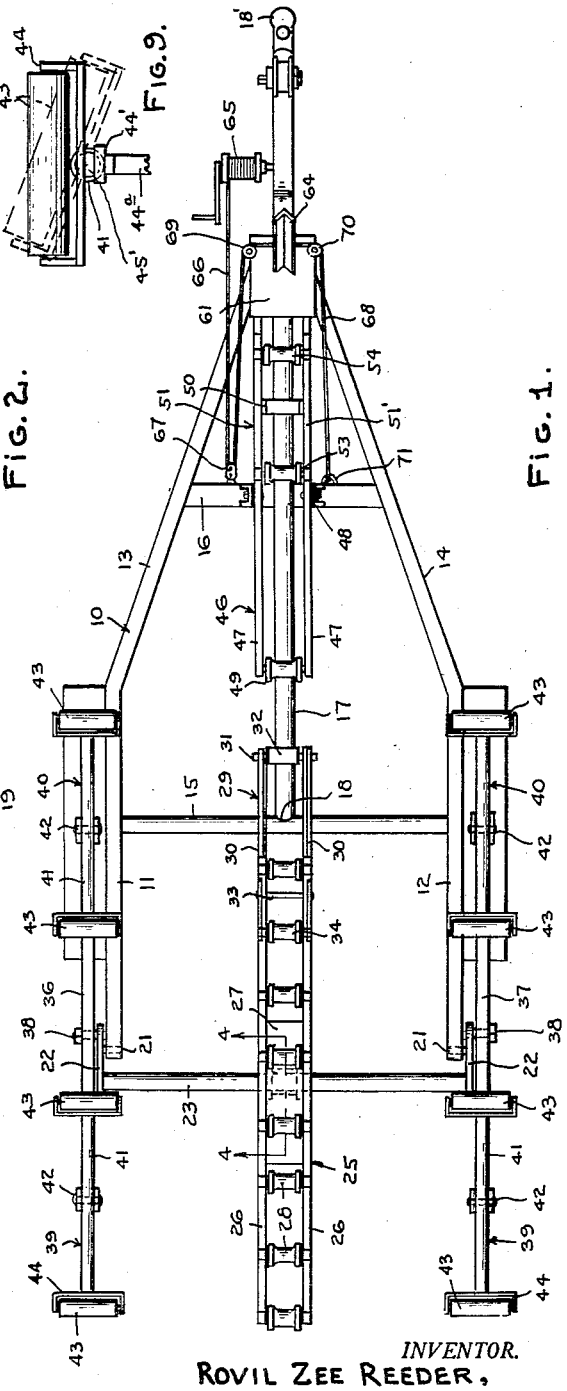
INVENTOR.
ROVIL ZEE REEDER,
BY
ATTORNEY March 18, 1958 R. Z. REEDER 2,827,188
BOAT TRAILER
Filed June 20, 1957 2 Sheets-Sheet 2
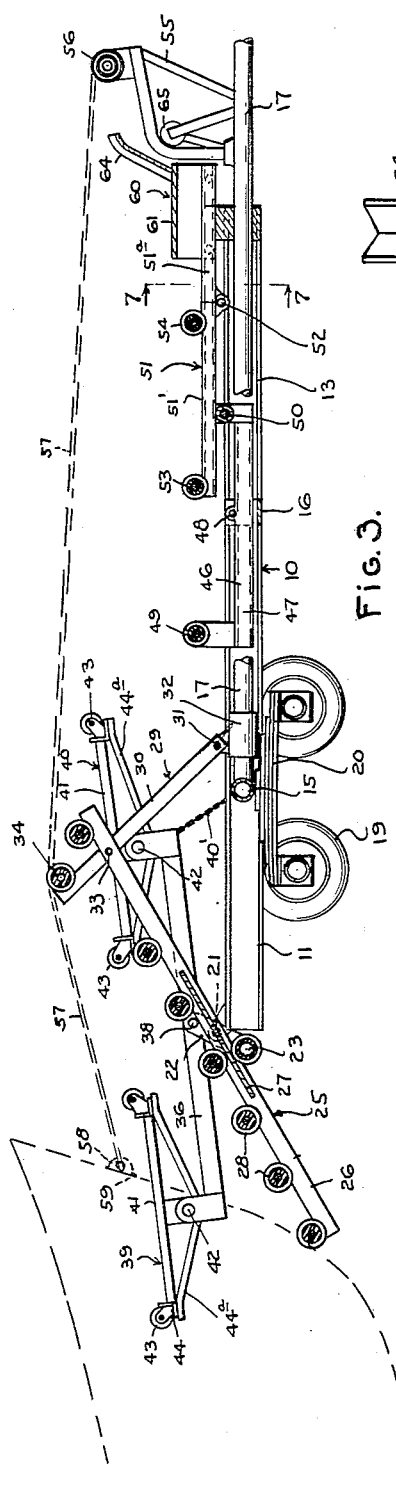
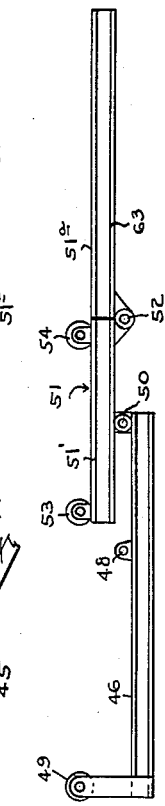
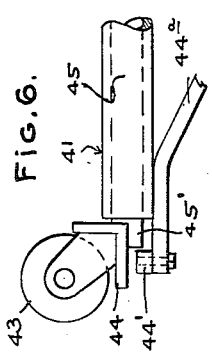
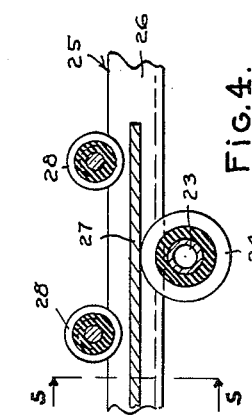
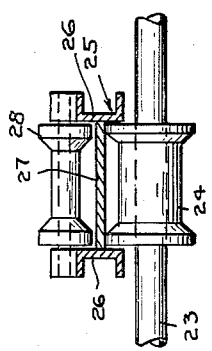
INVENTOR.
ROVIL ZEE REEDER,
BY
ATTORNEY United States Patent Office 2,827,188
Patented Mar. 18, 1958

2,827,188

BOAT TRAILER

Rovil Zee Reeder, Miami, Fla.

Application June 20, 1957, Serial No. 666,938

7 Claims. (Cl. 214—505)

The present invention relates to a boat trailer.

A primary object of the invention is to provide an improved boat trailer to facilitate loading, carrying and launching the boat with a minimum amount of work by the user, the trailer being so constructed that the hull of the boat is relieved of excessive strain at all times during the loading, carrying or launching of the same.

A further important object of the invention is to provide a boat trailer having a movable primary support for the boat and secondary supports shiftable into stabilizing engagement with the hull of the boat by the movement of the primary support.

A further object is to provide a boat trailer having a winch to facilitate loading and launching the boat, and a novel snubbing device for the loading and launching cable associated with the primary support and arranged to counteract swaying of the boat during loading and launching due to side winds and the like.

A further object is to provide in a boat trailer of the above-mentioned character a movable carriage device for pushing the boat rearwardly upon the trailer to facilitate launching the same.

A further important object is to provide means operated partly by the weight of boat for shifting the boat gently from an inclined to a horizontal position upon the trailer and vice-versa, during the loading and launching of the boat.

A further object is to provide a boat trailer having a self-adjusting roller bed for supporting the weight of the boat and engaging the hull at a plurality of points, so that the hull is never subjected to excessive strain at any one point or points.

Further and general objects of the invention are to provide a boat trailer of simplified and rugged construction, which is easy to operate, affords an adequate support for the boat in all adjusted positions of the latter, and which is relatively inexpensive to manufacture.

Other objects and advantages of the invention will be apparent during the course of the following description.

In the accompanying drawings, forming a part of this application, and in which like numerals are employed to designate like parts throughout the same.

Figure 1 is a plan view of a boat trailer in accordance with the invention,

Figure 2 is a side elevation of the trailer with the primary and secondary supporting means in boat carrying positions, Figure 3 is a longitudinal section of the trailer with the primary and secondary supporting means in tilted boat loading or launching positions, Figure 4 is a fragmentary longitudinal section taken substantially on line 4—4 of Figure 1, Figure 5 is a transverse section taken substantially on line 5—5 of Figure 4, Figure 6 is a slightly enlarged fragmentary side elevation of one self-adjusting hull supporting rollers, Figure 7 is a slightly enlarged transverse section taken substantially on line 7—7 of Figure 3, Figure 8 is a slightly enlarged side elevation of forward boat keel supporting frames and, Figure 9 is a fragmentary end elevation of one hull supporting roller assembly.

In the drawings, wherein for the purpose of illustration is shown a preferred embodiment of the invention, the numeral 10 designates generally a main horizontal frame including frame sides 11 and 12 which are spaced apart and parallel for a portion of the length of the main frame, Figure 1, the frame sides including forwardly converging elongated extensions 13 and 14, as shown. The frame sides 11 and 12 are rigidly connected by a transverse horizontal brace 15, adjacent the rear ends of the converging extensions 13 and 14, and these extensions are further rigidly connected intermediae their ends by a stout transverse horizontal brace 16, as shown in the drawings. A central longitudinal tongue 17 extends between the converging extensions 13 and 14, and has its rear end rigidly secured to the cross brace 15 as shown at 18. The tongue 17 extends forwardly of and between the forward extremities of the converging extensions 13 and 14, and the latter are rigidly secured to the tongue 17 and their forward ends. The tongue 17 is equipped at its forward end with a suitable conventional hitch device 18', adapted for connection with an automobile bumper trailer hitch, or the like, in the usual manner.

The trailer frame 10 is provided with any preferred type of wheeled undercarriage, such as the tandem wheel undercarriage shown generally at 19 in the drawings for the purpose of illustration. The undercarriage 19 preferably includes spring supporting means 20, rigidly connected in a suitable manner with the transverse brace 15 of the frame 10. I wish to make clear that I do not intend to limit the boat trailer to a particular type of wheeled undercarriage, and any preferred type of undercarriage, other than the one shown in the drawings, may be employed if desired.

Pivoted upon the rear ends of the frame sides 11 and 12 at 21 are a pair of vertically swingable lifting arms or cranks 22. The rear ends of the cranks 22 are rigidly connected by a horizontal transverse reaction bar 23, Figure 1, which bar 23 has a freely rotatable roller 24 suitably mounted thereon at its longitudinal center and at the transverse center of the trailer in alignment with the longitudinal tongue 17.

A vertically swingable and longitudinally shiftable primary support or ladder frame 25 is provided, above the reaction bar 23, and extending longitudinally in substantial alignment with the tongue 17. The ladder frame 25 extends for substantial distances upon opposite sides of the reaction bar 23, and comprises frame bars or sides 26, which are spaced apart and parallel. Near the longitudinal center of the ladder frame 25, a flat roller engaging plate 27 is rigidly secured between the frame sides 26, by welding or the like, and this plate 27 bears directly upon the freely rotatable roller 24, whereby the ladder frame 25 may shift longitudinally a limited amount by means of the plate 27 rolling upon the roller 24.

A plurality of longitudinally equidistantly spaced boat keel engaging rollers 28 of hard rubber or the like are suitably journaled for rotation upon the frame sides 26 of the ladder frame, and the rollers 28 are disposed above the ladder frame sides 26, as shown in the drawings.

A ladder frame extension 29 including spaced parallel frame sides 30 is disposed forwardly of the ladder frame 25, and the ladder frame extension is provided at its forward end with a transverse horizontal rock shaft 31, rigid with the frame sides 30, and pivoted within a suitable bearing 32, in turn rigidly mounted upon the tongue 17, somewhat forwardly of the transverse brace 15, Figure 1. The ladder frame extension 29 and the ladder frame 25 are pivotally connected at 33 in crossed relation, Figures 1 and 3. The rear end of the ladder frame extension 29 carries a boat keel engaging roller 34 which may be identical with the other rollers 28 of the ladder frame 25. As shown clearly in Figures 1 and 3, the forwardmost roller 28 of the ladder frame 25 is arranged forwardly of the roller 34. The arrangement is such that the ladder frame 25 and the ladder frame extension 29 constitute a jack knife construction, whereby pivoting or tilting of the ladder frame 25 under the load of the boat causes the simultaneous elevating or tilting of the ladder frame extension 29, and also causes a longitudinal shifting of the ladder frame 25 upon the roller 24.

Secondary boat supporting means is employed in conjunction with the primary support afforded by the ladder frame 25. This means comprises a pair of parallel longitudinal beams 36 and 37 arranged outwardly of the main frame sides 11 and 12, and somewhat above the latter. The beams 36 and 37 are disposed adjacent the lifting cranks 22 and pivoted thereto at 38, beyond the sides of the pivots 21 remote from the transverse reaction bar 23, Figure 1. The pivots 38 of the beams 36 and 37 are preferably arranged at or near the longitudinal centers of the beams 36 and 37, as shown. The beams 36 and 37 extend for substantial distances upon opposite sides of their pivots 38, and the forward ends of the beams 36 and 37 lie forwardly of the transverse brace 15, and their rear ends extend rearwardly of the transverse reaction bar 23. The beams 36 and 37 may be limited in their vertical swinging movement by any desirable means, such as chains 40'.

The beams 36 and 37 carry pairs of self-adjusting roller units 39 and 40 near their opposite ends, and each of these units embodies a longitudinal arm assembly 41, rockably secured at 42 to the respective beams 36 and 37. The arm assemblies 41 extend longitudinally of the beams 36 and 37, and are rackable in vertical planes upon their pivots 42. The arm assembly 41 of each unit 39 and 40 is provided at its forward and rear ends with laterally self-adjusting rollers 43 of hard rubber or the like. Each roller 43 is freely journaled for rotation upon a bracket 44, having a shaft extension 45 swiveled within the arm assembly 41, whereby each roller 43 is free to turn upon the longitudinal axis of the shaft assembly 45 for adjusting itself automatically to the contour of the boat hull. It may now be seen that each roller unit 39 is bodily adjustable upon the pivot 42, and each roller 43 of the unit is also self-adjusted upon the axis of the shaft assembly 45. The roller units 39 and 40 are of course bodily carried by the vertically swingable beams 36 and 37, in turn carried by the lifting cranks 22. Each of the rollers 43 and brackets 44 are individually self-adjusting through the medium of a stub shaft 45' and a pivotal movement of the rollers and the brackets 44 are limited by blocks 44' that are detachably connected to an extended end of truss bars 44a that are rigidly connected to the members 40 adjacent the ends thereof. It will be apparent, that should either of the rollers 43 become damaged or worn, they may be quickly and easily replaced by removing the block 44' and sliding the stub shaft 45' outwardly of the tubular frame members 39 and 40.

Forwardly of the ladder frame 25 and the ladder frame extension 29 and in longitudinal alignment therewith is a first generally horizontal roller bed frame 46, including frame sides 47, as shown. The roller bed frame 46 is pivoted intermediate its ends as at 48 to the transverse brace 16, and the frame 46 extends upon opposite sides of the brace 16, as shown. At its rear end, the frame 46 has a boat keel engaging roller 49 freely journaled thereon, and this roller may be identical with the rollers 28 and 34 previously described. At its forward end, the frame 46 is pivotally connected at 50 to and in underlying relation to a second or forward roller bed frame 51, hinged intermediate its ends as at 52 forming sections 51' and 51a. The frame 51 is provided at its rear end with a boat keel engaging roller 53, identical with and at the same elevation as the other boat keel engaging rollers previously described. An additional boat keel engaging roller 54 is journaled upon the frame 51 intermediate its ends and near and above the hinge 52, as shown.

As shown in the drawings, the forwardmost section 51a of the roller bed frame 51 extends a substantial distance forwardly of its hinge 52 and terminates substantially at the forward extremities of the converging frame extensions 13 and 14 to rest thereon. The arrangement of the pivots 48 and hinge 52 is such that the roller bed frames 46 and 51 may adjust themselves automatically by swinging in vertical planes in limited amounts, so that the rollers 49, 53 and 54 will properly engage and support the keel of the boat when the latter is in the carrying position upon the trailer.

Near the forward end of the tongue 17, the same has rigidly mounted thereon a suitably braced upstanding supporting structure 55, carrying at its top a manually operated winch 56. The winch 56 is operable to wind up and pay out a cable 57, adapted for connection at 58 with the towing eye 59 on the prow of the boat.

A carriage 60 to facilitate launching the boat from the trailer is provided, and this carriage may comprise a generally inverted U-shaped member 61 having rollers 62 journaled upon its opposite sides for guided engagement with the frame sides 63 of the forward roller bed frame 51. In other words, the frame sides 63 constitute tracks for the rollers 62 of the carriage 60, so that the latter may be shifted longitudinally along the frame 51 by means to be described. The carriage 60 further includes an upstanding somewhat inclined boat prow rest 64, preferably V-shaped in cross section as shown.

The means for operating the carriage 60 upon the frame 51 comprises a separate manual winch 65 supported upon one side of the tongue 17, forwardly of the carriage 60. A cable 66 wound by the winch 65 is trained over a sheave 67 attached to the brace 16. The cable extends forwardly from the sheave 67 in a generally U-shaped loop 68 and is trained over two additional sheaves 69 and 70 attached to the carriage 60, as shown. The end of the cable 66 is then secured at 71 to a ring or the like which is attached to the cross brace 16 at its side remote from the sheave 67, see Figure 1. The arrangement is such that when the cable 66 is wound up by the winch 65, the carriage 60 will be propelled rearwardly upon the frame 51 which serves as a track for the carriage. The prow engaging rest 64 will force the boat rearwardly upon the trailer and over the several keel engaging rollers which are supporting the boat, to facilitate the launching of the latter.

*Operation*

Assume that the boat is being carried by the trailer and is resting upon the same in a horizontal position, as shown particularly in Figure 2, and assume further that it is desired to launch the boat into the water at the bank of a river or the like.

The trailer is manipulated into position at the bank of the river and the wheeled undercarriage 19 is positioned close to the bank, but it is never necessary to position the undercarriage in the water. The cable 57 is attached to the towing eye 59 on the prow of the boat, and the winch 65 carrying the cable 66 is operated for driving the carriage 60 rearwardly upon the frame 51. This pushes the boat rearwardly over the keel supporting rollers 54, 53, 49, 34 and 28. At this time, the secondary roller supporting units 39 and 40 have their self-adjusting rollers 43 engaging the hull of the boat at points well above the keel supporting rollers to stabilize the boat.

When the center of gravity of the boat reaches the point rearwardly upon the trailer where the center of gravity or weight is rearwardly of the pivots 21 and above the reaction bar 23, the reaction bar 23 will begin to swing downwardly about the pivots 21 of the lifting cranks 22. When this occurs, the roller 24 supporting the ladder frame 25 will also move downwardly and the ladder frame 25 will move downwardly and also begins to pivot or swing vertically upon the roller 24 as a fulcrum, for assuming an inclined position.

At this time, the keel of the boat will be entirely clear of the roller 49 and all of the keel engaging rollers forwardly of the ladder frame 25, and the several rollers 29 of the ladder frame will now constitute the sole support for the keel of the boat during launching. Due to the pivotal connection at 33 between the ladder frame 25 and the ladder frame extension 29, the latter will begin to swing upwardly about its pivot 31 at the same time that the rear end of the ladder frame 25 swings downwardly, Figure 3. Also due to the connection between the frames 25 and 29, the ladder frame 25 will be caused to shift forwardly longitudinally somewhat, and the engagement of the roller 24 with the flat plate 27 of the ladder frame will facilitate this movement.

As the reaction bar 23 shifts downwardly under the influence of the weight of the boat, and the ladder frame 25 begins to assume the boat launching position shown in Figure 3, the forward ends of the lifting cranks 22 will be elevated, as shown in Figure 3, and this will bodily elevate or lift the beams 36 and 37 above the elevation which they normally assume in the boat carrying positions of Figure 2. By virtue of this arrangement, the self-adjusting hull stabilizing rollers 43 are elevated automatically whenever the boat is being launched from the trailer or loaded onto the trailer. This constitutes an important feature of the invention, since it is highly desirable to eliminate any lateral swaying or shifting of the boat during the launching of the same into the water or when the boat is being hauled onto the trailer. While the boat is in the inclined position, during launching or loading, the necessity for adequately stabilizing the hull is critical, and by means of the secondary supports afforded by the roller units 39 and 40, this object is fully accomplished.

Simultaneous with the above operations, and when the boat with the ladder frame 25 begins to assume an inclined position for launching, the operator begins to pay out the cable 57 by means of the winch 56. The cable 57 will engage the roller 34 at the top of the inclined ladder frame extension 29, and the cable 57 will thus be held elevated well above the level of the main frame 10 as shown in Figure 3. This arrangement constitutes another very important feature of the invention, in that the engagement of the cable 57 over the roller 34 affords an effective snubber or retarder for the boat to prevent the same from swaying laterally during the critical portion of the launching operation due to side winds or the like. Since the roller 34 maintains the cable well elevated, the tensioned cable is always exerting a true longitudinal pull or break upon the boat as the latter rolls downwardly toward the water. The combination of the cable trained over the roller 34 with the stabilizing effect upon the hull afforded by the roller units 39 and 40 firmly resists any lateral swaying or swinging of the boat during the launching. Continued paying out of the cable 57 allows the boat to roll smoothly and gradually into the water until the boat begins to float and is fully launched.

The procedure for loading the boat from the water onto the trailer is substantially the reverse of the above-described operation, and should be obvious. Briefly, with the elements of the trailer arranged generally as shown in Figure 3, and with the cable 57 attached to the eye 59 of the boat, the winch 56 is operated to wind up the cable. The boat is gradually pulled up along the inclined ladder frame 25 and the secondary roller supporting units 39 and 40 are elevated to stabilize the sides of the hull well above the elevation of the lowermost rollers 28. When the center of gravity of the boat passes over the pivots 21 in the forward direction, the weight of the boat upon the forward roller units 40 begins to swing the beams 36 and 37 downwardly, and simultaneously causes the lifting cranks 22 to turn in the clockwise direction, Figure 3, for elevating the reaction bar 23 with its roller 24. When this occurs, the ladder frame 25 begins to swing toward the horizontal position, and simultaneously shifts longitudinally rearwardly over the freely rotatable roller 24. As this occurs, the jack knife connection with the ladder frame extension 29 causes the frame 29 to also swing downwardly toward the horizontal position of Figure 2. The rollers 28 of the ladder frame 25 now move upwardly relative to the auxiliary roller units 39 and 40, and the latter begin to shift downwardly relative to the keel supporting rollers 28.

The weight of the boat is now transferred gradually to the keel supporting rollers and the secondary roller units 39 and 40, with the parts in the horizontal positions of Figure 2. Additionally, as the boat advances forwardly onto the trailer, the keel of the boat begins to come in contact with the additional keel supporting rollers 49, 53 and 54 of the roller bed frames 46 and 51, which frames may readily adjust themselves vertically upon their pivots 48, 50 and hinge 52, so that the keel is adequately and evenly supported throughout the entire length of the same. When the prow of the boat comes into contact with the rest 64, the carriage 60 will be gradually returned to the forward end of the trailer, and the forward movement of the carriage 60 is checked by the engagement of the rest 64 with an upright stop 72, rigidly secured to the tongue 17 and the framework 55.

It may now be seen that the trailer mechanism is substantially entirely self-adjusting, and it is unnecessary to make any further adjustments of the mechanism when the boat is in the fully loaded or carrying position shown in Figure 2. Also, the arrangement is such that the keel and hull of the boat are adequately supported at all times during carrying, launching and loading, and no part of the keel and hull is ever subjected to an excessive load or strain by the trailer mechanism. The several hull engaging rollers 43 are self-adjusting, as stated, to conform to the shapes of various boats which may be handled by the trailer, and the keel engaging and supporting rollers 49, 53 and 54 are also self-adjusting under the load of the boat.

It is to be understood that the form of the invention herewith shown and described is to be taken as a preferred example of the same, and that various changes in the shape, size and arrangement of parts may be resorted to, without departing from the spirit of the invention or scope of the subjoined claims.

Having thus described my invention, I claim:

1. A boat trailer comprising a wheeled supporting frame, a primary movable supporting member carried by said frame and adapted to receive the weight of the boat during launching the boat from the trailer or loading the boat onto the trailer, secondary movable supporting means for the boat connected with the primary supporting member and operated by the weight of the boat upon the primary supporting member to cause a portion of the weight of the boat to be transferred from the primary supporting member to the secondary supporting means, and means mounted upon the trailer for pulling the boat onto and for allowing the boat to pass from the primary supporting member.

2. A boat trailer comprising a wheeled supporting frame, a reaction device pivoted to the supporting frame, secondary boat supporting beams pivoted to the reaction device and adapted to be bodily raised and lowered thereby, a primary supporting device movably connected with the pivoted reaction device and adapted to actuate the latter for elevating and lowering the secondary supporting beams when the weight of the boat is upon the primary supporting device, and winch means for drawing the boat onto the primary supporting device and for allowing the boat to pass from the primary supporting device into the water.

3. A boat trailer comprising a wheeled supporting frame, lifting crank means pivoted to the supporting frame, secondary boat supporting means pivoted to said lifting crank means, a primary boat supporting member movably engaging said lifting crank means, a member pivoted to said supporting frame and pivoted to said primary supporting member and having a jack knife connection with the latter, whereby the primary supporting member may tilt and shift longitudinally relative to said lifting crank means under the influence of the weight of the boat, boat keel engaging roller means on said supporting frame forwardly of said primary supporting member, and winch means mounted upon said supporting frame for drawing the boat onto the trailer and allowing the boat to pass from the trailer.

4. A boat trailer comprising a wheeled supporting frame, lifting crank means pivoted to said supporting frame, a pair of beams pivoted to said lifting crank means near opposite sides of said frame, self-adjusting hull engaging roller units carried by said beams, a primary keel engaging supporting member arranged between said beams and roller units and having rollers to engage the keel of the boat and resting upon said lifting crank means and being movable relative thereto, a member pivoted to said supporting frame and to said primary supporting member and having a roller adapted to be elevated above the primary supporting member when the primary supporting member is tilted during the launching of the boat or the loading of the same onto the trailer, a cable connected with the prow of the boat and trained over the last-named roller, and a winch upon said supporting frame adapted to wind up said cable or pay out the same.

5. A boat trailer according to claim 4, and self-adjusting boat keel engaging roller means mounted upon said supporting frame forwardly of said primary supporting member and beams.

6. A boat trailer comprising a supporting frame, a pair of lifting cranks pivoted to said supporting frame, a transverse reaction bar connecting said lifting cranks, a pair of beams pivoted to said lifting cranks near opposite sides of the supporting frame, self-adjusting roller units carried by said beams and having rollers adapted to engage the hull of the boat, a longitudinal ladder frame including hull engaging rollers positioned between said beams and movably engaging said reaction bar, a member pivoted to said supporting frame and pivotally connected with said ladder frame near the forward end of the latter, a roller carried by said pivoted member and adapted to be elevated above the ladder frame when the ladder frame and member are inclined relative to the supporting frame during the launching or loading of the boat, a cable for connection with the boat adapted to be trained over said last-named roller, a winch mounted upon said supporting frame to pay out and wind up said cable, roller bed frames pivotally mounted upon said supporting frame forwardly of said ladder frame and having rollers to engage the keel of the boat, a carriage movably mounted upon one of said roller bed frames for movement longitudinally of the trailer and including a rest member adapted to engage the prow of the boat, and winch means connected with said carriage to shift the same rearwardly for moving the boat toward the ladder frame during the launching of the boat.

7. A boat trailer comprising a wheeled supporting frame, a pair of lifting cranks pivoted to said supporting frame, a reaction bar connecting corresponding ends of said cranks, generally horizontal beams pivoted to said cranks near their other corresponding ends remote from the reaction bar, self-adjusting roller units carried by said beams, a roller carried by the reaction bar near the transverse center of the trailer, a longitudinal ladder frame resting upon said roller of the reaction bar and being shiftable longitudinally and vertically swingable, a ladder frame extension pivoted to the supporting frame and also pivoted to the ladder frame near the forward end of the same and crossing the ladder frame, rollers journaled upon the ladder frame for engaging the keel of the boat, a roller journaled upon one end of the ladder frame extension and adapted to be elevated above the ladder frame when the ladder frame and ladder frame extension are tilted during launching of the boat, a cable for connection with the boat and adapted to be trained over the last-named roller, a winch mounted upon the supporting frame near the forward end of the trailer for winding up and paying out the cable, keel engaging rollers mounted upon the supporting frame forwardly of the ladder frame and ladder frame extension, a carriage mounted upon the trailer for longitudinal movement near the forward end of the trailer and having a part to engage the prow of the boat, and means for shifting the carriage rearwardly to begin the launching of the boat.

No references cited.